United States Patent [19]

Galliker et al.

[11] 4,261,805

[45] Apr. 14, 1981

[54] METHOD FOR REGENERATING ACTIVATED CARBON

[75] Inventors: Joseph Galliker, Wettingen; Fritz Münzel, Wetzikon, both of Switzerland

[73] Assignee: BBC Brown Boveri & Company Limited, Baden, Switzerland

[21] Appl. No.: 38,136

[22] Filed: May 11, 1979

[30] Foreign Application Priority Data

May 23, 1978 [CH] Switzerland ............... 5626/78

[51] Int. Cl.$^3$ .................. B01J 3/08; B01J 19/12
[52] U.S. Cl. ............................ 204/157.1 H
[58] Field of Search ........... 204/157.1 H, 158 HE, 204/157.15

[56] References Cited

U.S. PATENT DOCUMENTS

| | | | |
|---|---|---|---|
| 3,825,480 | 7/1974 | Pelofsky et al. | 204/193 |
| 3,846,296 | 11/1974 | Hay | 210/27 |
| 4,168,295 | 9/1979 | Sawyer | 204/193 |

*Primary Examiner*—Howard S. Williams
*Attorney, Agent, or Firm*—Burns, Doane, Swecker & Mathis

[57] ABSTRACT

The present invention provides a method for the continuous regeneration of activated carbon which has become loaded and deactivated subsequent to an aqueous filtration process, wherein organic chemical substances adsorbed on the activated carbon are oxidized and decomposed in the presence of water and oxygen by the action of hydroxide radicals. Hydroxide radicals are produced in the water by means of x-radiation in the range of from about 50 keV to about 800 keV, preferably in the energy range from about 100 keV to about 300 keV. An additional ultrasonic treatment may be employed to improve the effectiveness of the regeneration process. X-ray tube arrangements with tubular anodes are particularly suitable for use with the irradiation regeneration process.

8 Claims, 5 Drawing Figures

METHOD FOR REGENERATING ACTIVATED CARBON

BACKGROUND OF THE INVENTION

The invention relates to a method of regenerating activated carbon by the decomposition of adsorbed, organic material in the presence of water and oxygen.

The use of activated carbon as an adsorption and filter material, particularly in the purification of drinking water and waste water and in the food industry, is well known. Therefore, the regeneration of activated carbon adsorbents is of great importance in view of its widespread use.

Activated carbon may be regenerated by thermal regeneration, wherein the adsorbent is heated to about 800° C. to 900° C., possibly with the simultaneous addition of water vapor. During thermal regeneration processes, however, losses of between 3% and 15% of activated carbon are common. The regenerated product often exhibits an adsorption capacity which is reduced to 80% of the initial value. This reduction occurs because the smallest pores, in particular, which are able to retain molecules up to a molecular weight of 500, are destroyed during the thermal regeneration process. With the thermal regeneration method, which can only be used with granular activated carbon and not with comparatively cheap pulverized activated carbon, both the direct loss of activated carbon and that of adsorption capacity must be compensated for. For example, after six regeneration cycles, a carbon filter must generally be completely charged with fresh carbon.

The regeneration of activated carbon by chemical oxidation (e.g., with permanganate) is effected at room temperature, but is without practical significance because the chemical oxidants are not easily introduced, if at all, into the smallest pores of the activated carbon. Thus these pores often become blocked so that the regeneration is not completely effective.

Biological regeneration of activated carbon in the preparation of drinking water and waste water renders possible the removal of deposited and adsorbed materials which can be decomposed biologically. However, refractory organic substances which cannot be decomposed biologically have to be removed from the pores of the activated carbon by another method of regeneration.

A regeneration of activated carbon which is loaded with organic materials and which can be carried out at room temperature in the presence of water and oxygen (e.g., from air) by means of $\gamma$-rays, is described in U.S. Pat. No. 3,846,296. In the process described in that patent, waste water which has previously been biologically treated and passed through a sand filter is forced through a radiation container of stainless steel partially filled with activated carbon to which compressed air is supplied near the bottom. Ordinary commercial activated carbon from coal, oil sludge, wood or coconut shells with a relatively large surface is used. A $\gamma$-ray-source with radioactive isotopes such as $^{60}$Co or $^{137}$Cs is located in the upper central portion of the container.

In order to be able to cleanse the activated carbon of sand and other solid substances at various time intervals, a high-pressure water rinse line is connected to the radiation container and enables the activated carbon to be cleansed. This gamma radiation regeneration process renders possible a continuous regeneration of the activated carbon. Practical use of this method is rendered difficult, however, by safety measures necessitated by the use of the radioactive isotopes. The radiation sources must be checked for tightness at certain intervals and be renewed, which generally has to be carried out by specialized personnel. The level of radiation cannot be adapted to the amount of material to be irradiated. The gamma ray dose necessary for the regeneration of the activated carbon can only be regulated by altering the speed at which the material to be irradiated passes through the radiation regeneration chamber.

OBJECTS AND SUMMARY OF THE INVENTION

It is therefore an object of the present invention to provide a method of regeneration of activated carbon adsorbents which is practical and efficient.

It is further an object of the present invention to provide a method of regeneration of activated carbon adsorbents which eliminates the problems of the prior art as described above.

It is still further an object of the present invention to provide novel apparatus for the regeneration of activated carbon adsorbents.

In one aspect of the present invention there is provided a method of the regeneration of activated carbon containing adsorbed organic chemical substances wherein the activated carbon is irradiated with X-radiation in the presence of water and oxygen so as to form hydroxide radicals which regenerate the activated carbon by oxidation of the organic chemical substances.

In another aspect of the present invention there is provided an apparatus for use in the regeneration of activated carbon having organic substances adsorbed thereon comprising a radiation chamber having a flow tube disposed therein, means to supply activated carbon to said flow tube having organic substances adsorbed thereon, and means to supply water and oxygen to said flow tube.

BRIEF DESCRIPTION OF THE DRAWINGS

The invention may be understood with reference to the following Figures.

DETAILED DESCRIPTION OF THE INVENTION

Figure 1:
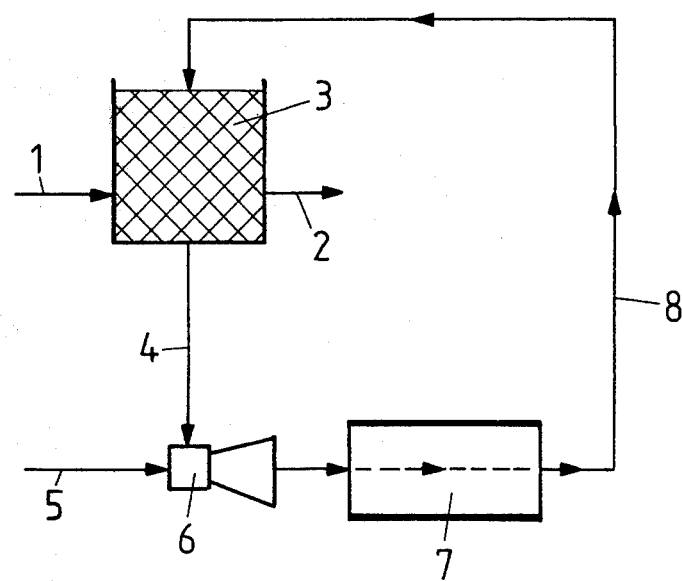
FIG. 1 shows a diagrammatic representation of a method of irradiation regeneration of activated carbon.

The present invention is based on the knowledge that photon rays transmit their energy, by absorption or scattering, wholly or partially to shell electrons which are then braked by non-resilient collisions. The atoms or molecules which are hit become ionized or excited. If such a supply of energy is transmitted into water, aqueous suspensions, or the like containing water, then $OH^-$ radicals are produced inter alia. These $OH^-$ radicals are useful in the decomposition of organic substances which are adsorbed on activated carbon during a purification process.

An energy of about 1.3 eV is needed for the dissociation of a water molecule. The high energy of the photons of about $10^3$ eV is therefore sufficient to excite and dissociate a large number of molecules. The $OH^-$ radicals exhibit an oxidizing effect. This oxidizing effect of the $OH^-$ radicals in the presence of water is decisive in the conversion of organic substances into $CO_2$, $NO_2$ and $SO_2$, etc. In comparison with other free radicals, the $OH^-$ radical reacts particularly easily and, as an electrophilic reagent, attacks organic molecules where the electron density is greatest. It can easily absorb an electron and oxidize organic and inorganic anions through this reaction.

The $OH^-$ radicals may be produced by irradiating the mixture with a suitable source of energy which will effectively dissociate the water molecules to form the radicals. The $OH^-$ radicals are preferably produced by irradiating water with X-rays, with a tube voltage in the range from 50 kV to 800 kV being suitable. Corresponding to the associated photon energies are half-value layers in the water of 3.3 cm to 8.8 cm, which render a favorable dimensioning of the radiation chamber possible. High-power tubes, having rotating anodes for example, are suitable for the voltage range below 100 kV in question. X-ray tubes with voltages in the range from 100 kV to 300 kV are particularly advantageous, however, wherein the X-radiation penetrates through the anode and renders possible a high degree of utilization of the radiation. The anode of the X-ray tube can be made cylindrical or tubular (e.g., in the form of a flow tube) in which case the material to be irradiated is inside or outside this tube, according to whether the cathode is disposed outside or inside the tubular anode. The material to be irradiated can be used simultaneously as a coolant for the anode so that the radiation losses remain low. One advantage of X-radiation is that the dose power can be adapted to the amount of material to be irradiated by altering the tube current. Since the attenuation coefficient of lead for a 200 kV X-radiation is about ten times as great as, for example, for the $^{137}Cs$ radiation, the ray shielding can be correspondingly lighter. Because the X-ray installation can be switched off, the radiation chamber is accessible at any time for cleaning and maintenance work. The risk of accidents is consequently lower than with isotope installations.

The regeneration of the activated carbon can be improved by the additional use of ultrasonic irradiation. The irradiation of the activated carbon to be treated can be effected simultaneously with the X-radiation or displaced in time (e.g., subsequent thereto). The regeneration of the activated carbon may advantageously be effected continuously in the presence of water and oxygen.

Figure 3:
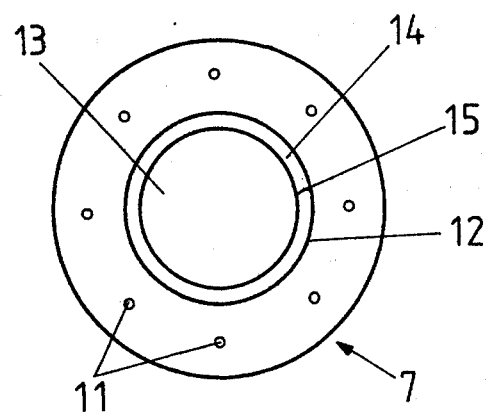
FIG. 3 is a diagrammatic cross-sectional representation of a radiation chamber wherein the material to be irradiated is disposed inside a tubular anode.
Figure 4:
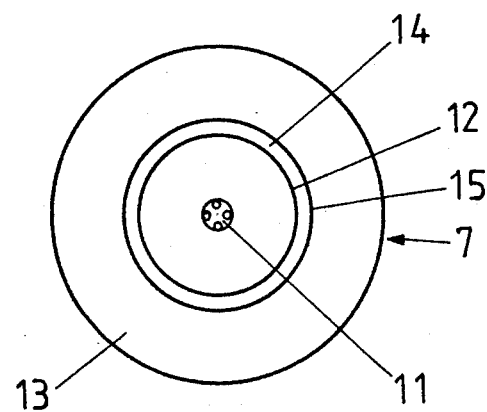
FIG. 4 is a diagrammatic cross-sectional representation of a radiation chamber wherein the material to be irradiated is disposed outside a tubular anode.

FIG. 1 illustrates an activated-carbon filter 3 to which contaminated water 1 is supplied and from which purified water 2 can be taken off. During the irradiation regeneration process some of the loaded activated carbon 4 is removed continuously from the filter together with water and supplied to an injector 6. In this injector, oxygen or air 5 is supplied to the loaded activated carbon 4. If the loaded activated carbon 4 is not accompanied by sufficient water from the filter 3, fresh water can be supplied to the injector 6 apart from air 5. From the injector the loaded activated carbon 4 together with air and water is supplied to an irradiation chamber 7 and exposed to X-radiation with a dose in the range of from about 5 kGy to about 15 kGy. The activated carbon 8 purified in the radiation chamber 7 is then supplied to the filter 3 so that the activated carbon circuit is completed. The tube voltage of the X-ray tube 10 is preferably selected in the range from 50 kV to 800 kV. For tubular anodes 12, which surround the material 13 to be irradiated (as shown in FIG. 3) or are surrounded by this material (as shown in FIG. 4) voltages in the range from 100 kV to 300 kV are particularly suitable because the radiation has to pass through the anode in both cases. Higher voltages are suitable but require a higher dielectric strength of the transformer, a higher insulation of the X-ray tube and increased expenditure for X-ray protection. Thin-walled stainless steel, for example, is suitable for the transport tube which may advantageously have a diameter in the range of from 5 cm to 50 cm. The radiation section may appropriately have a length in the range from 0.5 m to 2 m. The passage of the material to be irradiated should be effected with laminar flow with flow speeds of less than 1 m/sec. An additional treatment of the material to be irradiated with ultrasonics in the presence of water improves the purifying effect upon the activated carbon.

Figure 2:
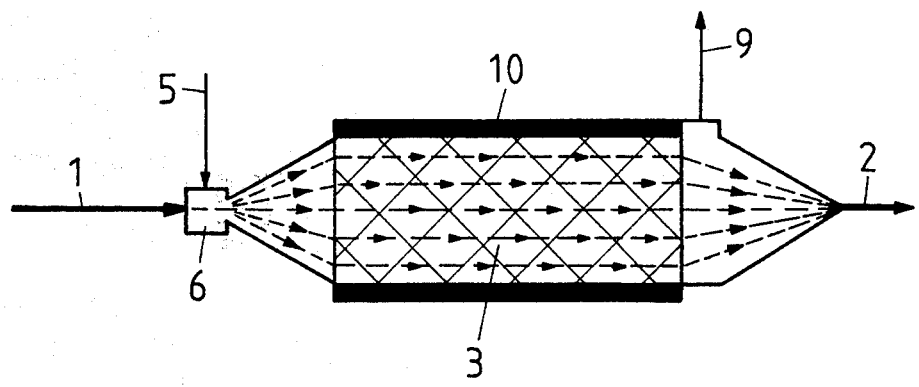
FIG. 2 shows a diagrammatic representation of a method of irradiation regeneration wherein the activated carbon is exposed to the radiation in the filter.

FIG. 2 shows a method of regenerating activated carbon wherein the activated carbon remains in the filter 3 during the X-radiation. Contaminated water 1 and air 5 are supplied to the activated-carbon filter 3 through the injector 6. The gaseous oxidation products formed during the irradiation with an X-ray tube 10 with a tubular anode 12 (as shown in FIG. 3) are drawn off through an extract fan 9 so that purified water 2 leaves the filter.

FIGS. 3 and 4 show, in cross section, radiation chambers 7 with cylindrical or tubular anodes 12, which are surrounded by a cooling jacket 15, and an anode cooling liquid 14 between cooling jacket and anode serving to cool the anode. According to FIG. 3, the heating filaments of the cathode are disposed around the anode externally. According to FIG. 4, the heating filaments are disposed inside the anode.

Figure 5:
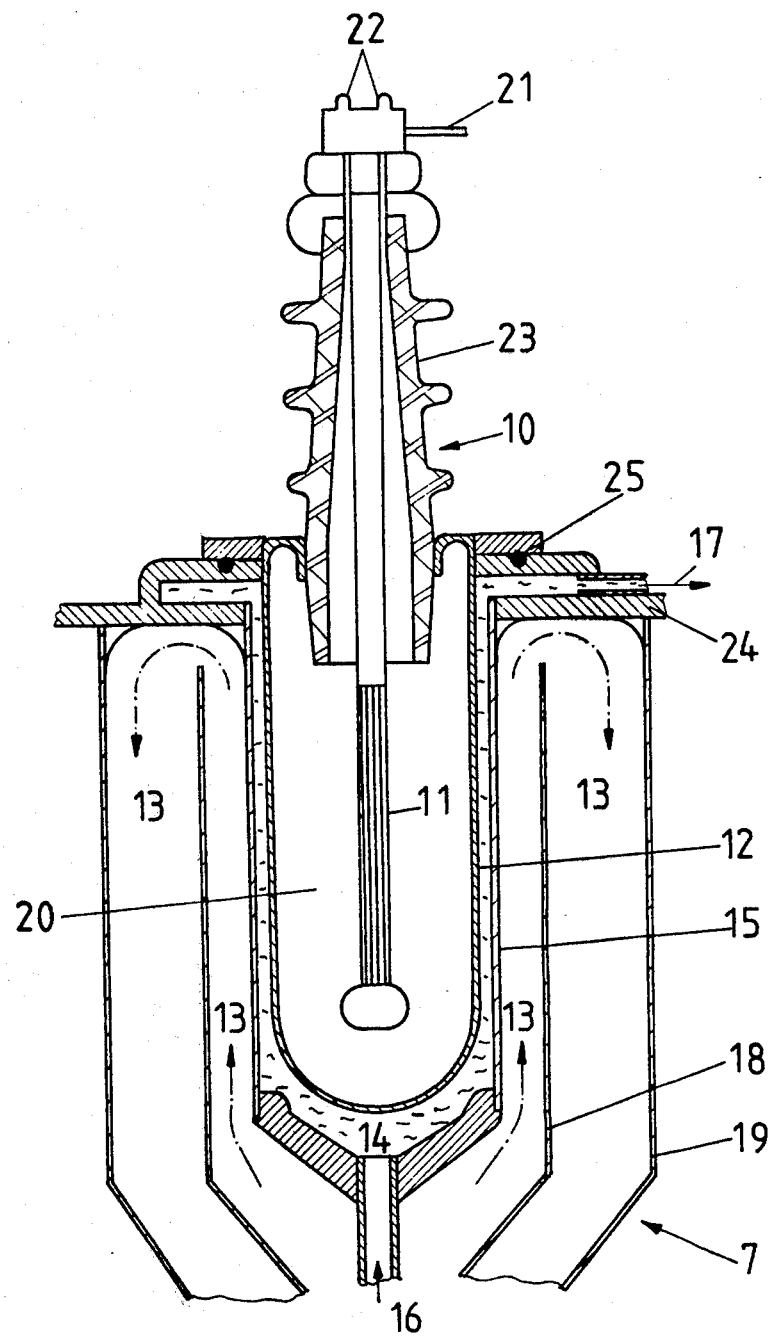
FIG. 5 is a diagrammatic representation of a radiation chamber as shown in FIG. 4, in longitudinal section.

The longitudinal section of a radiation chamber 7 (as shown in FIG. 4) can be seen in FIG. 5. The cathode 11 is in the center of the X-ray tube 10. The two poles of the cathode heating connections 22 are taken out through a high-voltage insulator 23. During operation of the tube, they are at high voltage while the anode 12 is grounded. The anode 12 consists of an aluminum cylinder which is gilded internally and which surrounds the cathode. The dose power can be increased to 5 to 6 times by gilding the anode. A cooling jacket 15 is fitted around the anode 12 and spaced therefrom. The cooling water 14, which flows in through a coolant inlet 16, flows through the gap exisiting between anode 12 and cooling jacket 15, leaving the radiation chamber 7 through a coolant outlet 17. Between cathode 11 and anode 12 there is an evacuated space 20 which can be connected to a vacuum pump through a connection 21. Naturally, a high-vacuum tube with a sealed off chamber 20 may also be used, in which case the internal pressure should be less than $10^{-3}$ N/m². The material 13 to be irradiated flows around the cooling jacket 15 in duplex operation and a partition 18 with low ray absorption in conjunction with the walls 24 and 19 of the radiation chamber 7 ensures a deflection of the flow through 180°. A sealing ring is designated by 25.

In order to achieve a high utilization of the radiation, the separate cooling jacket 15 around the anode can be omitted and the cooling of the anode effected by the material to be irradiated. This construction of the X-ray tube and its arrangement inside the material to be irradiated renders possible an almost complete utilization of the radiation produced thereby. The method described is particularly suitable for the preparation of drinking water and waste water, since organic substances which become adsorbed on the activated carbon have to be decomposed for regeneration to occur.

I claim:

1. A method of regenerating activated carbon having organic chemical substances adsorbed thereon comprising irradiating said activated carbon with X-radiation in the presence of water and oxygen with energy sufficient to cause hydroxide radicals to be formed which aid in the regeneration of said activated carbon by oxidation of said organic chemical substances.

2. The method of claim 1 wherein said activated carbon is irradiated with X-radiation in the energy range of from about 50 keV to about 800 keV.

3. The method of claim 2 wherein said activated carbon is irradiated with X-radiation in the energy range of from about 100 keV to about 300 keV.

4. The method of claim 2 wherein said activated carbon is irradiated with X-radiation in the energy range of from about 5 kGy to about 15 kGy.

5. The method of claim 1 wherein said activated carbon is additionally irradiated with ultrasonic irradiation in the presence of water.

6. The method of claim 5 wherein said ultrasonic treatment is subsequent to said irradiation step.

7. The method of claim 1 wherein said organic chemical substances are adsorbed on said activated carbon during filtration in a filter, and the activated carbon is irradiated in said filter.

8. The method of claim 1 wherein said organic chemical substances are adsorbed on said activated carbon during filtration in a filter, and the activated carbon is removed from the filter, irradiated, and returned to the filter.

* * * * *